US009531988B2

(12) United States Patent
Tsuchida et al.

(10) Patent No.: US 9,531,988 B2
(45) Date of Patent: Dec. 27, 2016

(54) SYNTHESIZED IMAGE OUTPUT APPARATUS AND SYNTHESIZED IMAGE OUTPUT METHOD CAPABLE OF PROCESSING WITH LOWER POWER CONSUMPTION

(71) Applicant: OLYMPUS CORPORATION, Tokyo (JP)

(72) Inventors: Ryusuke Tsuchida, Tokyo (JP); Keisuke Nakazono, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 141 days.

(21) Appl. No.: 14/512,616

(22) Filed: Oct. 13, 2014

(65) Prior Publication Data

US 2015/0103208 A1 Apr. 16, 2015

(30) Foreign Application Priority Data

Oct. 16, 2013 (JP) ................................. 2013-215739

(51) Int. Cl.
*H04N 5/907* (2006.01)
*H04N 5/272* (2006.01)
*H04N 5/77* (2006.01)
*H04N 101/00* (2006.01)

(52) U.S. Cl.
CPC ............. *H04N 5/907* (2013.01); *H04N 5/272* (2013.01); *H04N 5/772* (2013.01); *H04N 2101/00* (2013.01); *H04N 2201/0084* (2013.01)

(58) Field of Classification Search
CPC ........ H04N 5/907; H04N 5/272; H04N 5/772; H04N 5/2723
See application file for complete search history.

(56) References Cited

U.S. PATENT DOCUMENTS

2012/0162243 A1* 6/2012 Matsuo ................ G01C 21/367
345/592
2015/0163416 A1* 6/2015 Nevatie ................ H04N 5/2723
348/239

FOREIGN PATENT DOCUMENTS

JP 2006-3876 A 1/2006

* cited by examiner

*Primary Examiner* — Christopher K Peterson
(74) *Attorney, Agent, or Firm* — Westerman, Hattori, Daniels & Adrian, LLP

(57) ABSTRACT

An image output apparatus includes a first synthesis processing unit configured to generate a first synthetic image for display through a synthesis process and output the first synthetic image, a second synthesis processing unit configured to generate a second synthetic image for synthesis through a synthesis process and cause the second synthetic image to be stored in the external storage area, and an image selection control unit configured to instruct the second synthesis processing unit to generate the second synthetic image, select whether or not the second synthetic image is to be used as one of the input images used to generate the first synthetic image, and instruct the first synthesis processing unit to generate the first synthetic image including the plurality of selected input images.

8 Claims, 6 Drawing Sheets

SYNTHESIZED IMAGE OUTPUT APPARATUS AND SYNTHESIZED IMAGE OUTPUT METHOD CAPABLE OF PROCESSING WITH LOWER POWER CONSUMPTION

BACKGROUND OF THE INVENTION

Field of the Invention

The present invention relates to an image output apparatus and an image output method.

Priority is claimed on Japanese Patent Application No. 2013-215739, filed Oct. 16, 2013, the content of which is incorporated herein by reference.

Description of Related Art

In an imaging apparatus such as a camera for still images or a camera for moving images, a configuration causing a captured photographic image to be displayed on a display device such as a LCD (liquid crystal display) installed on the imaging apparatus has been known.

In the imaging apparatus having such a configuration, when a photographic image is displayed on the display device, an OSD (on-screen display) image such as a character image is displayed to be superimposed on the photographic image as well.

In such an imaging apparatus, generally, an image output apparatus is a circuit that is built in in a system LSI or an image processing LSI in the imaging apparatus. The image output apparatus generates a display image. The image output apparatus generates a synthetic display image synthesized by superimposing a plurality of input images such as a photographic image and an OSD image (see FIG. 6), and outputs the generated synthetic image to be displayed on the display device. At this time, the image output apparatus generates and outputs a synthetic image periodically according to a period by which a frame rate of the display device on which an image being displayed is updated, regardless of whether an image to be displayed on the display device has been updated.

Further, in the imaging apparatus, the image output apparatus generally acquires each input image used for generation of a synthetic image from an external storage area such as a memory similarly connected to a direct memory access (DMA) bus via the DMA bus to which the system LSI or the image processing LSI including the image output apparatus is connected, through DMA transfer. For this reason, when the number of input images used for generation of a single synthetic image increases, during each period by which the frame rate of the display device is updated, an amount of image data to be processed (transferred) through the DMA transfer increases, and thus there is a problem in that power consumption of the image output apparatus increases.

In this regard, as a technique of reducing the power consumption of the image output apparatus, there is, for example, a technique disclosed in JP 2006-003876A. In the technique disclosed in JP 2006-003876A, an image output apparatus outputs a synthetic image generated by causing a plurality of input images acquired from an external storage area to be superimposed on one another to a display device, and stores the generated synthetic image in an external storage area which is different from that of the input image. Further, in the technique disclosed in JP 2006-003876A, when not all input images are updated within a certain period of time, instead of acquiring the input images used for generation of the synthetic image, the image output apparatus acquires the stored synthetic image from the external storage area, and outputs the acquired synthetic image to the display device. Further, in the technique disclosed in JP 2006-003876A, when any one input image is updated within a certain period of time, the image output apparatus acquires all input images used for generation of the synthetic image from the external storage area, outputs a newly generated synthetic image to the display device, and causes the generated new synthetic image to be stored in an external storage area (different from that of the input image).

As described above, in the technique disclosed in JP 2006-003876A, based on whether or not the input image used for generation of the synthetic image has been updated within a certain period of time, an image to be acquired from the external storage area is changed during each period by which the frame rate of the display device is updated, and thus the power consumption of the image output apparatus is reduced when the image to be displayed on the display device has not been updated. More specifically, when no input image is updated, an operation of acquiring the already generated synthetic image from the external storage area is performed, and thus an amount of image data to be transferred through the DMA transfer is reduced to be smaller than when all input images are acquired from the external storage area, and the power consumption of the image output apparatus is reduced. Furthermore, in the technique disclosed in JP 2006-003876A, operations of components other than a circuit used to acquire a synthetic image are stopped, and thus the power consumption of the image output apparatus can be further reduced.

Regarding displaying the image on the display device, there are a situation that an input image is not updated by each frame, that is, a situation that update frequency of the input image is low, and a situation that the input image is updated by each frame, that is, a situation that update frequency of the input image is high. In such a situation that update frequency of the input image is low, for example, there are a situation of displaying a confirmation image to check a captured still image, and a situation of displaying a recorded still image stored in recording medium such as a memory card. As the situation that the update frequency of the input images is high, for example, there is a situation of checking a subject in a still image or a moving image, that is, a situation of displaying a live-view image (through-the-lens image). Therefore, it is necessary that the image output apparatus does not only generate a synthetic image based on the input images whose update frequency is low, but also generates a synthetic image based on the input images including more than one input image whose update frequency is high, such as the live-view images that are always updated, during each period at which the frame-rate of the display device is updated.

SUMMARY OF THE INVENTION

According to a first aspect of the present invention, an image output apparatus includes a first synthesis processing unit configured to read a plurality of designated input images from an external storage area storing the plurality of input images, generate a first synthetic image for display through a synthesis process of causing one of the plurality of read input images to be superimposed on any other one of the plurality of read input images, and output the first synthetic image, a second synthesis processing unit configured to generate a second synthetic image for synthesis through a synthesis process of causing the plurality of designated input images to be superimposed on any other one of the plurality of input images included in the first synthetic image and cause the second synthetic image to be stored in the external storage area, and an image selection control unit configured to instruct the second synthesis processing unit to generate the second synthetic image including the plurality of input images selected based on input image information that is input, select whether or not the second synthetic image is used as one of the input images used to generate the first synthetic image based on the input image information, and instruct the first synthesis processing unit to generate the first synthetic image including the plurality of selected input images.

According to a second aspect of the present invention, in the first aspect, the image selection control unit may include an image selecting unit configured to select the plurality of input images to be included in the first synthetic image based on information of the plurality of input images used for generation of the first synthetic image, the information being included in the input image information, and select the input image having a low update frequency satisfying a predetermined condition among the plurality of input images to be included in the first synthetic image based on information of an update frequency corresponding to each of the input images, the information being included in the input image information. An instruction to generate the second synthetic image by performing the synthesis process on the plurality of input images having the low update frequency selected by the image selecting unit may be sent.

According to a third aspect of the present invention, in the second aspect, the image selection control unit may include an update detecting unit configured to detect an update of any one of the plurality of input images having the low update frequency included in the second synthetic image based on image update information used to detect whether or not each of the input images has been updated, the image update information being included in the input image information. When the update detecting unit detects that none of the input images included in the second synthetic image has been updated, an instruction to generate the first synthetic image by performing the synthesis process on the plurality of input images having the high update frequency read from the external storage area using the second synthetic image as one of the input images may be sent by the image selection control unit, but an instruction to generate the second synthetic image may not be sent by the image selection control unit. When the update detecting unit detects that any one of the input images included in the second synthetic image has been updated, an instruction to generate the first synthetic image by performing the synthesis process on the plurality of input images having the high update frequency read from the external storage area and the plurality of input images having the low update frequency may be sent by the image selection control unit, and an instruction to generate the second synthetic image by performing the synthesis process on the plurality of input images having the low update frequency may be sent by the image selection control unit.

According to a fourth aspect of the present invention, in any one of the first to third aspects, the first synthesis processing unit may include an image reading unit configured to read the plurality of input images which are designated by the image selection control unit from the external storage area. The second synthesis processing unit may generate the second synthetic image by performing the synthesis process on the plurality of input images which are designated by the image selection control unit among the plurality of input images read by the image reading unit. The second synthesis processing unit may include an image writing unit configured to cause the generated second synthetic image to store in the external storage area.

According to a fifth aspect of the present invention, in the fourth aspect, when the first synthesis processing unit generates the first synthetic image using the second synthetic image as one of the input images, the image reading unit may read the second synthetic image as one of the plurality of input images from the external storage area.

According to a sixth aspect of the present invention, in the fifth aspect, the first synthesis processing unit may include a plurality of image reading units corresponding to the input images read from the external storage area. The second synthesis processing unit may generate the second synthetic image by performing the synthesis process on the plurality of input images which are designated by the image selection control unit among the input images read from the plurality of image reading units.

According to a seventh aspect of the present invention, in any one of the first to sixth aspects, the second synthesis processing unit may generate transparency information of the second synthetic image based on the transparency information of each of the plurality of input images included in the second synthetic image, and cause the generated transparency information and the generated second synthetic image to be stored in the external storage area. The first synthesis processing unit may use the transparency information of each of the plurality of input images included in the first synthetic image for generation of the first synthetic image.

According to an eighth aspect of the present invention, in any one of the first to seventh aspects, the second synthesis processing unit may compress the generated second synthetic image and then cause the compressed second synthetic image to be stored in the external storage area, and the first synthesis processing unit may decompress the compressed second synthetic image and then use the decompressed second synthetic image for generation of the first synthetic image.

According to a ninth aspect of the present invention, an image output method includes a first synthesis processing process of reading a plurality of designated input images from an external storage area storing the plurality of input images, generating a first synthetic image for display through a synthesis process of causing one of the plurality of the read input images to be superimposed on any other one of the plurality of read input images, and outputting the first synthetic image; a second synthesis processing process of generating a second synthetic image for synthesis through a synthesis process of causing the plurality of designated input images to be superimposed on any other one of the plurality of input images included in the first synthetic image and causing the second synthetic image to be stored in the external storage area; and an image selection control process of instructing the second synthesis processing process to generate the second synthetic image including the plurality of input images selected based on input image information that is input in the second synthesis processing process, selecting whether or not the second synthetic image is to be used as one of the input images used to generate the first synthetic image based on the input image information, and instructing the first synthesis processing process to generate the first synthetic image including the selected input images in the first synthesis processing process.

DETAILED DESCRIPTION OF THE INVENTION

Figure 1:
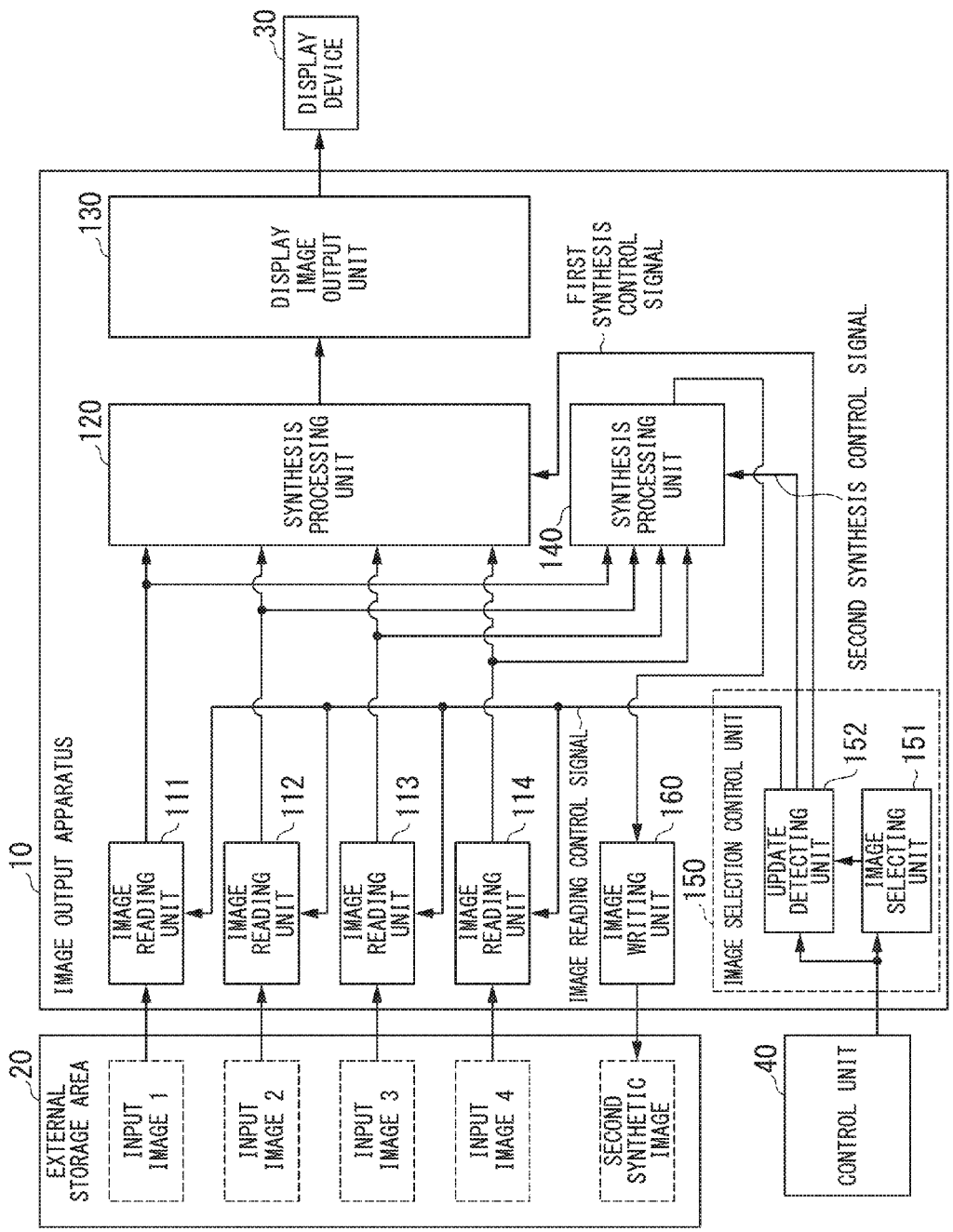
FIG. 1 is a block diagram showing a schematic configuration of an image output apparatus according to an embodiment of the present invention.

Hereinafter, embodiments of the present invention will be described with reference to the appended drawings. FIG. 1 is a block diagram showing a schematic configuration of an image output apparatus according to the present embodiment. An image output apparatus 10 shown in FIG. 1 includes 4 image reading units 111 to 114, 2 synthesis processing units 120 and 140, a display image output unit 130, an image selection control unit 150, and an image writing unit 160. FIG. 1 shows components associated with the image output apparatus 10 such as an external storage area 20, a display device 30, and a control unit 40 together. In the following description, when the image reading units 111 to 114 are not distinguished from one another, the image reading units 111 to 114 are referred to collectively as an "image reading unit 110."

The image output apparatus 10 generates a synthetic image (hereinafter referred to as a "first synthetic image") for display on the display device 30 which is synthesized (hereinafter referred to as a "synthesis process") by causing a plurality of input images stored in the external storage area 20 to be superimposed on one another, and outputs image data of the generated first synthetic image. Further, the image output apparatus 10 generates a synthetic image (hereinafter referred to as a "second synthetic image") for synthesis obtained by performing the synthesis process on only input images having a low update frequency among the plurality of input images included in the generated first synthetic image, and outputs image data of the generated second synthetic image.

For example, the image output apparatus 10 may be an independent component installed in the imaging apparatus or may be a component that is installed in a system LSI or an image processing LSI installed in the imaging apparatus. In the present embodiment, the configuration of a system in which the image output apparatus 10 is installed is not limited at all.

FIG. 1 shows a configuration of the image output apparatus 10 that outputs the image data of the first synthetic image to be displayed on the display device 30, and outputs the image data of the second synthetic image to be stored in the external storage area 20. In the configuration of the image output apparatus 10 shown in FIG. 1, the image output apparatus has a configuration capable of performing the synthesis process on four input images.

In the image output apparatus 10, input images used to generate a synthetic image are classified into input images having a high update frequency and input images having a low update frequency based on the proportion at which each of input images included in the first synthetic image to be displayed on the display device 30 is updated. A frame rate at which an image being displayed through the display device 30 is updated depends on a specification of the display device 30, and is 30 frames/sec, 60 frames/sec, 120 frames/sec, or the like, for example. In the image output apparatus 10 of the present embodiment, information representing whether or not an image being displayed in a current frame is to be updated in a next frame is set as an update frequency, and an input image satisfying a condition that an image not be updated in a next frame is classified as an input image having a low update frequency.

A condition for determining whether an update frequency of an input image is high or low is not limited to a determination as to whether or not an update is to be performed in units of frames as described above. For example, a period of time of an interval at which an input image is updated may be set as a value of an update frequency. In this case, a predetermined period of time (for example, 1 second) may be set as a threshold value used to determine whether an update frequency of an input image is high or low, and an input image satisfying a condition that an update not be updated during the predetermined period of time or more may be classified as an input image having a low update frequency.

Further, the number of input images classified as the input image having the low update frequency, that is, the number of input images included in the second synthetic image, may be decided in advance. For example, input images are arranged in ascending order of the update frequencies, and the number of input images included in the second synthetic image may be decided in advance.

The external storage area 20 is a memory such as a dynamic random access memory (DRAM) that stores image data of input images used for generation of a synthetic image by the image output apparatus 10. The external storage area 20 is connected to a DMA bus or the like, and reads stored image data or writes (stores) image data through the DMA transfer. An operation of reading or writing image data from or in the external storage area 20 (access to a general memory) is performed through an input/output terminal of a one system. However, in the configuration of the image output apparatus 10 shown in FIG. 1, for convenience of description, an input terminal and an output terminal corresponding to images being stored or to be stored in the external storage area 20 are assumed to be separately present.

The display device 30 is a display device such as a thin film transistor (TFT) LCD or an organic electro luminescence (EL) display, and displays an image according to the image data of the first synthetic image output from the image output apparatus 10. The display device 30 may be a display device such as an electronic view finder (EVF) or an external display such as a television. The display device 30 may have a configuration attachable to or removable from the image output apparatus 10 or the imaging apparatus.

The control unit 40 controls an overall system including the image output apparatus 10, that is, components installed in the system. Further, the control unit 40 outputs information (hereinafter referred to as "input image information") of input images used for generation of a synthetic image to the image output apparatus 10. The input image information output from the control unit 40 to the image output apparatus 10 includes, for example, information indicating an input image used for generation of a synthetic image among input images stored in the external storage area 20, that is, information (hereinafter referred to as "image selection information") for selecting an input image that is subjected to the synthesis process. Further, the input image information output from the control unit 40 to the image output apparatus 10 includes, for example, information (hereinafter referred to as "update frequency information") indicating an update frequency of each input image stored in the external storage area 20 in association with each input image. The control unit 40 sets a setting representing the input image information in, for example, a register or the like of the image output apparatus 10.

Further, the input image information output from the control unit 40 to the image output apparatus 10 includes, for example, information (hereinafter referred to as "image update information") for detecting whether or not each input image stored in the external storage area 20 has been updated. The image update information is information that is sequentially changed for the image output apparatus 10. Thus, for example, when the control unit 40 accesses the external storage area 20 or a component associated with an update of an input image, each signal is input to the image output apparatus 10 as the image update information. Examples of this signal include an enable signal used for the control unit 40 to select the external storage area 20 or each component associated with an update of an input image as an access target, an address designating a storage area of an input image stored in the external storage area 20, and a write signal used to write image data.

The image output apparatus 10 reads image data of input images used for generation of the first synthetic image and the second synthetic image from the external storage area 20 based on the input image information set by the control unit 40. The image output apparatus 10 outputs image data of the first synthetic image and image data of the second synthetic image that are generated by performing the synthesis process of the image data of the read input images.

The image selection control unit 150 includes, for example, a register to which the input image information is set by the control unit 40, and selects input images used for generation of the first synthetic image and the second synthetic image based on the set input image information. Further, the image selection control unit 150 switches whether or not the second synthetic image is to be selected as an input image used for generation of the first synthetic image based on the set input image information. Further, the image selection control unit 150 outputs a control signal for performing the synthesis process on the selected input image to the image reading unit 110, the synthesis processing unit 120, and the synthesis processing unit 140. The image selection control unit 150 includes an image selecting unit 151 and an update detecting unit 152.

The image selecting unit 151 selects input images used for generation of the first synthetic image from among input images stored in the external storage area 20 based on the image selection information set by the control unit 40. The image selecting unit 151 outputs information (hereinafter referred to as "first image selection information") indicating the selected input images to the update detecting unit 152. In the image output apparatus 10 of the present embodiment, the image data of the first synthetic image is output to be displayed on the display device 30. Thus, the first image selection information includes information indicating all input images to be displayed on the display device 30.

Further, the image selecting unit 151 selects input images used for generation of the second synthetic image obtained by performing the synthesis process on the input images having the low update frequency from among the input images included in the first synthetic image based on the update frequency information set by the control unit 40. The image selecting unit 151 outputs information (hereinafter referred to as "second image selection information") indicating the selected input images having the low update frequency to the update detecting unit 152. In the image output apparatus 10 of the present embodiment, the update frequency is information representing whether each input image is to be updated in a next frame. Thus, the update frequency information set by the control unit 40 includes information representing whether or not an update is to be performed in a next frame for each input image. Thus, the image selecting unit 151 outputs information identifying an input image satisfying a condition that an update not be performed in a next frame, that is, an input image including information indicating that an update is not to be performed in a next frame as an input image having a low update frequency, to the update detecting unit 152 as the second image selection information.

As described above, the update frequency of the input image is not limited at all to information representing whether or not an update is to be performed in a next frame. For this reason, as a condition for selecting only an input image having a low update frequency through the image selecting unit 151, there are various conditions according to an update frequency. For example, whether an update frequency is high or low may be indicated by two states, and information indicating any one state may be set as the update frequency information. In this case, the image selecting unit 151 outputs information identifying only an input image associated with information indicating a state of a low update frequency based on a condition that information indicating a state of a low update frequency be associated to the update detecting unit 152 as the second image selection information. Further, for example, an update frequency may be represented by a period of time of an interval at which each input image is updated, and information representing a period of time of an interval at which each input image is updated may be included as the update frequency information for each input image. In this case, the image selecting unit 151 outputs information identifying only an input image satisfying a condition that a period of time of an interval at which each input image is updated be a predetermined period of time (for example, 1 second) or more as an input image having a low update frequency based on the condition to the update detecting unit 152 as the second image selection information.

The update detecting unit 152 outputs a control signal (hereinafter referred to as an "image reading control signal") for giving an instruction to read image data of input images used for generation of the first synthetic image from the external storage area 20 to the image reading units 110 corresponding to the input images based on the first image selection information input from the image selecting unit 151. Further, the update detecting unit 152 outputs a control signal (hereinafter referred to as a "first synthesis control signal") for generating the first synthetic image by performing the synthesis process on the image data of the input images read by the image reading units 110 to the synthesis processing unit 120. More specifically, for example, there are cases in which image data of an input image 1 in the external storage area 20 shown in FIG. 1 is read as image data of the input images used for generation of the first synthetic image. In this case, the update detecting unit 152 outputs the image reading control signal for giving an instruction to read the input image 1 to the image reading unit 111 corresponding to the input image 1. Similarly, the update detecting unit 152 outputs the image reading control signals for giving instructions to read image data of corresponding input images 2 to 4 to the image reading unit 112 to the image reading unit 114 according to the input images used for generation of the first synthetic image. Then, the update detecting unit 152 outputs a control signal including information representing the image reading unit 110 that has read an input image to generate the first synthetic image to the synthesis processing unit 120 as the first synthesis control signal for generating the first synthetic image.

Further, the update detecting unit 152 outputs a control signal (hereinafter referred to as a "second synthesis control signal") for performing the synthesis process on the input images used for generation of the second synthetic image to the synthesis processing unit 140 based on the second image selection information input from the image selecting unit 151. More specifically, the input images used for generation of the second synthetic image are included in the input images used for generation of the first synthetic image. Thus, this is similar to the case in which the update detecting unit 152 has already output the image reading control signals for giving instructions to read image data of the input images used for generation of the second synthetic image to the image reading units 110 corresponding to the input images. Thus, the update detecting unit 152 outputs a control signal including information representing the image reading unit 110 that has read an input image that has been subjected to the synthesis process for generation of the second synthetic image among the input images read by the image reading units 110 to the synthesis processing unit 140 as the second synthesis control signal for generating the second synthetic image.

Further, the update detecting unit 152 detects whether or not the input image included in the second synthetic image has been updated based on the image update information input from the control unit 40. Further, the update detecting unit 152 outputs the image reading control signals, the first synthesis control signal, and the second synthesis control signal to the image reading units 110, the synthesis processing unit 120, and the synthesis processing unit 140 based on a result of detecting the update of the input images included in the second synthetic image.

More specifically, there are cases in which the update detecting unit 152 has detected that none of the input images included in the second synthetic image has been updated. In this case, the image reading control signals for reading the image data of the input image having the high update frequency and the image data of the second synthetic image stored in the external storage area 20 from the external storage area 20 as the image data of the input images used for generation of the first synthetic image are output to the image reading units 110. Further, the update detecting unit 152 outputs the first synthesis control signal for generating the first synthetic image by performing the synthesis process on the image data of the input images read by the image reading units 110 to the synthesis processing unit 120.

Further, when it is detected that any one of the input images included in the second synthetic image has been updated, the update detecting unit 152 outputs the image reading control signals for reading the image data of the input image having the high update frequency and image data of all input images included in the second synthetic image from the external storage area 20 as the image data of input images used for generation of the first synthetic image to the image reading units 110. Further, the update detecting unit 152 outputs the first synthesis control signal for generating the first synthetic image by performing the synthesis process on the image data of the input images read by the image reading units 110 to the synthesis processing unit 120. Furthermore, the update detecting unit 152 outputs the second synthesis control signal for generating the second synthetic image by performing the synthesis process on the image data of all input images included in the second synthetic image read by the image reading units 110 to the synthesis processing unit 140.

Further, a configuration and an operation of detecting whether or not the input images included in the second synthetic image have been updated based on the image update information input from the control unit 40 through the update detecting unit 152 will be described later.

Each of the image reading units 111 to 114 reads image data of a corresponding input image or the second synthetic image stored in the external storage area 20 according to the image reading control signal input from the image selection control unit 150 (the update detecting unit 152) through the DMA transfer. Each of the image reading units 111 to 114 outputs the read image data to the synthesis processing unit 120. In a configuration of the image output apparatus 10 shown in FIG. 1, the image reading unit 111 corresponds to the input image 1, the image reading unit 112 corresponds to the input image 2, the image reading unit 113 corresponds to the input image 3, and the image reading unit 114 corresponds to the input image 4. Further, all of the image reading units 111 to 114 can read the image data of the second synthetic image.

The synthesis processing unit 120 generates the first synthetic image by performing the synthesis process such as an addition process, a subtraction process, a weighting addition process, and an averaging process on the image data of the input images input from the image reading units 111 to 114 or the second synthetic image according to the first synthesis control signal input from the image selection control unit 150 (the update detecting unit 152). Then, the synthesis processing unit 120 outputs the image data of the generated first synthetic image to the display image output unit 130.

When generating the first synthetic image, the synthesis processing unit 120 performs the synthesis process using transparency information in addition to the image data of the input images or the second synthetic image used for generation of the first synthetic image. The transparency information is information representing whether or not each pixel in each image or each predetermined rectangular range is transparent (semi-transparent in some cases), and is represented by a weight value (0≤(weight value)≤1) used when the synthesis process (the weighting addition process) is performed. The image data of each input image and the second synthetic image are images that are not completely transparent (non-transparent) when the transparency information value is "1", becomes a transparent image as the value approaches "0", and is a completely transparent image when the value is "0". As the synthesis process is performed based on the image data and the transparency information, the first synthetic image on which a plurality of input images or the second synthetic image is superimposed can be generated. A method of the synthesis process using the transparency information which is performed in the synthesis processing unit 120 is similar to an image synthesis method in the image output apparatus according to the related art, and thus a detailed description thereof is omitted here.

In the following description, each input image includes the transparency information in addition to the image data. Here, in the present embodiment, the form of the image data or the transparency information included in each input image is not limited at all.

The display image output unit 130 converts the image data of the first synthetic image input from the synthesis processing unit 120 into a format in which the display device 30 connected to the image output apparatus 10 displays an image. The display image output unit 130 outputs the image data of the first synthetic image whose format has been changed according to a period of a frame rate at which a display image being displayed by the display device 30 is updated as image data of the display image to be displayed on the display device 30.

The synthesis processing unit 140 generates the second synthetic image by performing the same synthesis process as in the synthesis processing unit 120 on the image data of the input images input from the image reading units 111 to 114 according to the second synthesis control signal input from the image selection control unit 150 (the update detecting unit 152).

The second synthetic image generated by the synthesis processing unit 140 is a synthetic image obtained by performing the synthesis process on only the input images having the low update frequency among the input images included in the first synthetic image generated by the synthesis processing unit 120 as described above. In other words, the image output apparatus 10 performs the synthesis process on only the input images having the low update frequency in advance so that the synthesis process is not performed on all the input images included in the first synthetic image again when the synthesis processing unit 120 generates the first synthetic image. Further, when the synthesis processing unit 120 generates the first synthetic image, the second synthetic image is used instead of the input images having the low update frequency. Through this operation, the synthesis processing unit 120 does not perform the synthesis process on a plurality of input images having a low update frequency again, and thus can reduce a processing load when the synthesis processing unit 120 generates the first synthetic image.

To this end, the synthesis processing unit 140 generates the transparency information corresponding to the second synthetic image which is used when the synthesis processing unit 120 generates the first synthetic image as well. Then, the synthesis processing unit 140 outputs the image data of the second synthetic image including the generated transparency information to the image writing unit 160. A method of generating the transparency information corresponding to the second synthetic image through the synthesis processing unit 140 will be described later.

In the following description, the second synthetic image includes the transparency information in addition to the image data. Here, in the present embodiment, a form of the image data or the transparency information included in the second synthetic image is not limited at all.

The image writing unit 160 writes the image data of the second synthetic image input from the synthesis processing unit 140 in the external storage area 20 through the DMA transfer.

A method of generating the transparency information of the second synthetic image through the synthesis processing unit 140 will now be described. The following description will proceed with an example in which in the synthesis process of generating a synthetic image on which 4 input images are superimposed, and an undermost input image that is positioned at the bottom is not included. In other words, the description will proceed with an example in which the second synthetic image is generated by performing the synthesis process on 3 second to fourth input images superimposed on an undermost (first) input image. Here, it is possible to generate the same synthetic image as a synthetic image on which 4 input images are superimposed by causing the generated second synthetic image to be superimposed on the undermost input image in a next frame or a frame subsequent thereto.

In the following description, the image data of the input image 1 to the input image 4 is defined as image data Y1 to image data Y4, and the transparency information of the input image 2 to the input image 4 is defined as transparency information A2 to transparency information A4. At this time, image data Y of the first synthetic image generated by performing the synthesis process on all the (4) input images can be obtained as in the following Equation (1):

$$Y = Y1 \times (1 - A2) \times (1 - A3) \times (1 - A4) + \\ Y2 \times (A2) \times (1 - A3) \times (1 - A4) + Y3 \times (A3) \times (1 - A4) + Y4 \times (A4) \quad (1)$$

When the input image 2 to the input image 4 are selected to generate the second synthetic image, image data Y' of the second synthetic image can be obtained as in the following Equation (2). Firstly, a first difference is obtained by subtracting a term including the image data Y1 of the input image 1 from the image data Y of the first synthetic image. Then, a second difference is obtained by subtracting a product which is obtained by multiplying "1 minus A2", "1 minus A3", and "1 minus A4" from "1". Lastly, the image date Y' is obtained by dividing the first difference by the second difference.

$$Y' = \frac{(Y - (Y1 \times (1 - A2) \times (1 - A3) \times (1 - A4)))}{(1 - (1 - A2) \times (1 - A3) \times (1 - A4))} \quad (2)$$

$$= \frac{\begin{pmatrix} (Y2 \times (A2) \times (1 - A3) \times (1 - A4)) + \\ (Y3 \times (A3) \times (1 - A4)) + (Y4 \times (A4)) \end{pmatrix}}{(1 - (1 - A2) \times (1 - A3) \times (1 - A4))}$$

As described above, it is possible to obtain the image data of the second synthetic image having the low update frequency by subtracting the term including the image data of the input image having the high update frequency from the image data of the first synthetic image and dividing the difference by a value obtained by subtracting a product of multiplying the transparency information and the input image having the high update frequency from "1". This method similarly applies to a situation even when a plurality of input images has the high update frequency.

Further, when the input image 2 to the input image 4 are selected to generate the second synthetic image, the transparency information A' ($0 \le (A') \le 1$) of the second synthetic image can be obtained as in the following Equation (3). That is, the transparency information A' ($0 \le (A') \le 1$) of the second synthetic image can be obtained by subtracting the product of the transparency information A and the input image 1 from "1".

$$A' = (1 - (1 - A2) \times (1 - A3) \times (1 - A4)) \quad (3)$$

As described above, it is possible to obtain the transparency information of the second synthetic image having the low update frequency by subtracting the product of the transparency information and the input image having the high update frequency from "1". This method can be similarly applied even when a plurality of input images have the high update frequency.

The synthesis processing unit 140 outputs image data of the second synthetic image including transparency information A' of the second synthetic image generated as described above to the image writing unit 160. As a result, in the subsequent synthesis process, the synthesis processing unit 120 performs the synthesis process using the image data Y1 of the input image 1 and the image data Y' of the second synthetic image as in the following Equation (4) similar to Equation (1), and thus it is possible to generate the image data Y which is the same as the first synthetic image obtained by performing the synthesis process on all of the input image 1 to the input image 4 which is expressed in the above Equation (1).

$$Y = Y1 \times (1-A') + Y' \times (A') \qquad (4)$$

In other words, it is possible to generate the image data Y that is identical to the first synthetic image obtained by the above Equation (1) as expressed in the following Equation (5) by applying the image data Y' of the second synthetic image obtained by the above Equation (2) and the transparency information A' of the second synthetic image obtained by the above Equation (3) to the above Equation (4).

$$\begin{aligned} Y &= Y1 \times (1-A') + Y' \times (A') \qquad (5)\\ &= Y1 \times (1 - (1-(1-A2)\times(1-A3)\times(1-A4))) + \\ &\quad \frac{\begin{pmatrix} (Y2\times(A2)\times(1-A3)\times(1-A4)) + \\ (Y3\times(A3)\times(1-A4)) + (Y4\times(A4)) \end{pmatrix}}{\begin{pmatrix} 1-(1-A2)\times \\ (1-A3)\times(1-A4) \end{pmatrix}} \times \\ &\quad ((1-(1-A2)\times(1-A3)\times(1-A4)))\\ &= Y1 \times (1-A2)\times(1-A3)\times(1-A4) + \\ &\quad (Y2\times(A2)\times(1-A3)\times(1-A4)) + \\ &\quad Y3\times(A3)\times(1-A4) + Y4\times(A4) \end{aligned}$$

Through this configuration, the image output apparatus 10 selects only the input image having the low update frequency among a plurality of input images included in the first synthetic image, generates the second synthetic image that has been subjected to the synthesis process, and writes the second synthetic image in the external storage area 20. Then, when none of the input images included in the second synthetic image has been updated, the image reading unit 110 reads the image data of the single second synthetic image instead of reading image data of a plurality of input images having a low update frequency stored in the external storage area 20, and the synthesis processing unit 120 generates the first synthetic image using the input image having the high update frequency and the second synthetic image instead of the input image having the low update frequency. In other words, when none of the input images included in the second synthetic image has been updated, the image output apparatus 10 selects the second synthetic image as the input image used for generation of the first synthetic image.

As a result, in the image output apparatus 10, the data amount of the DMA transfer when the image reading unit 110 reads image data of a plurality of input images having a low update frequency can be reduced to the data amount of the DMA transfer when only the image data of the single second synthetic image is read. As a result, in the image output apparatus 10, the power consumption when the image reading unit 110 reads image data of a plurality of input images having a low update frequency can be reduced to the power consumption when only the image data of the single second synthetic image is read.

Further, in the image output apparatus 10, the second synthetic image is generated by performing the synthesis process on only the input image having the low update frequency and written in the external storage area 20, and the same synthesis process as in the image output apparatus of the related art is performed on the input image having the high update frequency. Thus, in the image output apparatus 10, the overall power consumption can be reduced without impairing the function of causing an image having a high update frequency to be superimposed. Further, in the imaging apparatus including the image output apparatus 10, even when an image in which an image having a high update frequency such as a live view image is synthesized with an image having a low update frequency is displayed on the display device 30, the power consumption of the imaging apparatus can be reduced.

The image output apparatus 10 may be configured such that the second synthetic image generated by the synthesis processing unit 140 is compressed using an existing compression method and then written in the external storage area 20.

In this case, the synthesis processing unit 120 decompresses the compressed second synthetic image read from the external storage area 20 using an existing decompression method, that is, restores the original second synthetic image, and then generates the first synthetic image by performing the synthesis process of synthesizing the second synthetic image with the input image having the high update frequency. As the second synthetic image is compressed and then written in the external storage area 20 as described above, in the image output apparatus 10, it is possible to further reduce the data amount when the image writing unit 160 and the image reading unit 110 transfer the second synthetic image through the DMA transfer. Further, the power consumption related to writing and reading of the second synthetic image in the image output apparatus 10 can be further reduced.

It is desirable to use a lossless compression/decompression technique when the second synthetic image is compressed or decompressed. Further, the synthesis processing unit 140 or the image writing unit 160 is considered to be a component for compressing the second synthetic image. The image reading unit 110 or the synthesis processing unit 120 is considered to be a component for decompressing the second synthetic image. However, a dedicated component for compressing and decompressing the second synthetic image may be provided in the image output apparatus 10. Thus, in the present embodiment, neither a component nor a method for compressing or decompressing the second synthetic image is limited at all.

Figure 2:
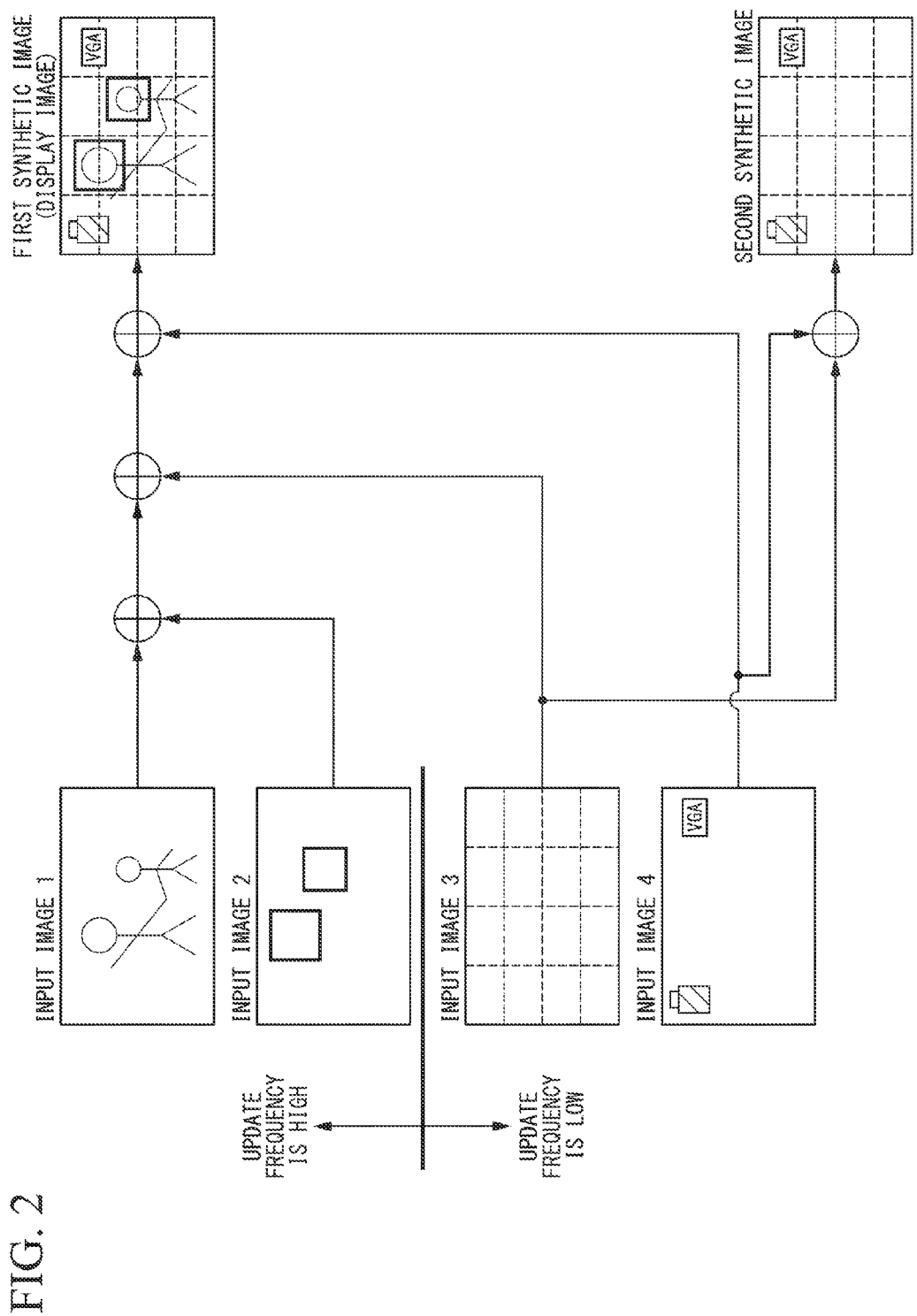
FIG. 2 is a diagram schematically showing an example in which a synthetic image on which a plurality of input images are superimposed is generated in the image output apparatus according to the present embodiment.

Next, an exemplary operation of the image output apparatus 10 according to a first embodiment will be described. FIG. 2 is a diagram schematically showing an example in which the image output apparatus 10 of the present embodiment generates a synthetic image on which a plurality of input images is superimposed. FIG. 2 shows a state in which the first synthetic image is generated by synthesizing the four input images 1 to 4 and displayed on the display device 30. The input image 1 shown in FIG. 1 is an example of a photographic image photographed by the imaging apparatus. The input image 2 shown in FIG. 2 is an example of an OSD image representing a detection state in a subject face detection function being operated when the imaging apparatus performs a photographing operation. The input image 3 is an example of an OSD image of an assist display that assists in deciding a composition when the imaging apparatus performs a photographing operation. The input image 4 is an example of an OSD image of an information display providing information such as the resolution of a photographic image photographed by the imaging apparatus or a remaining level of a battery provided in the imaging apparatus.

The following description will proceed under the assumption that the input image 1 and the input image 2 have high update frequency, and the input image 3 and the input image 4 have low update frequency. At this time, in the image output apparatus 10, the synthesis processing unit 120 generates a first synthetic image by performing the synthesis process on the image data of the input image 1 to the input image 4, and outputs the first synthetic image to the display image output unit 130. The display image output unit 130 outputs image data of a display image obtained by converting the image data of the first synthetic image input from the synthesis processing unit 120 to the display device 30. Further, in the image output apparatus 10, the synthesis processing unit 140 generates a second synthetic image by performing the synthesis process on the image data of the input image 3 and the input image 4 having the low update frequency, and outputs the second synthetic image to the image writing unit 160. The image writing unit 160 writes the image data of the second synthetic image input from the synthesis processing unit 140 in the external storage area 20 through the DMA transfer.

Thereafter, in the image output apparatus 10, the synthesis processing unit 120 generates the same first synthetic image as the first synthetic image by performing the synthesis process on the image data of the input image 1, the input image 2, and the second synthetic image. In the following description, in order to distinguish the first synthetic image generated by performing the synthesis process on the image data of the input image 1 to the input image 4 from the first synthetic image generated by performing the synthesis process on the image data of the input image 1, the input image 2, and the second synthetic image, the first synthetic image generated by performing the synthesis process on the image data of the input image 1, the input image 2, and the second synthetic image is referred to as a "third synthetic image." Then, the synthesis processing unit 120 outputs the generated third synthetic image to the display image output unit 130, and the display image output unit 130 outputs the image data of the display image obtained by converting the image data of the third synthetic image input from the synthesis processing unit 120 to the display device 30.

Figure 3:
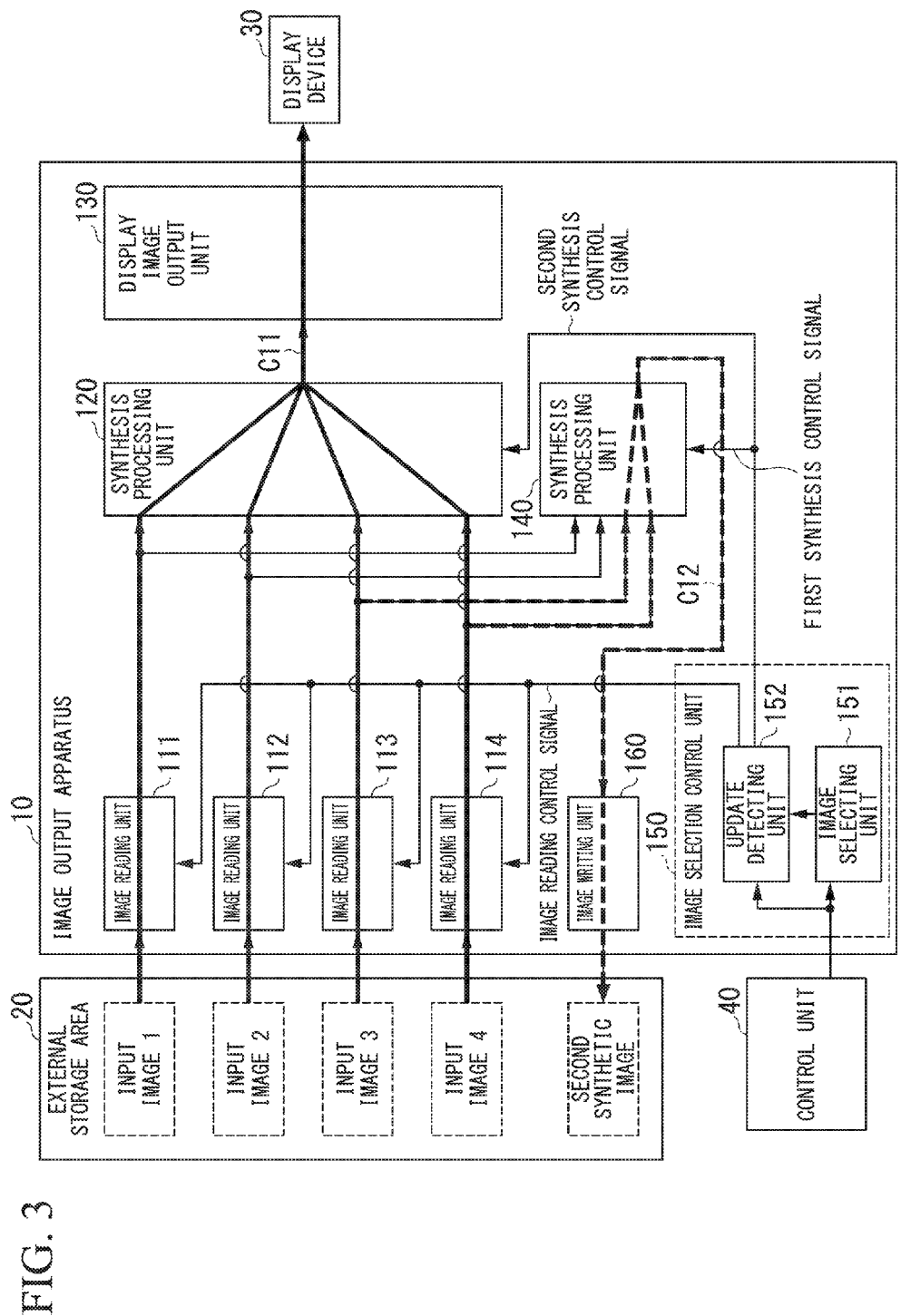
FIG. 3 is a diagram schematically showing a first exemplary operation of generating a synthetic image on which a plurality of input images are superimposed in the image output apparatus, according to the present embodiment.
Figure 4:
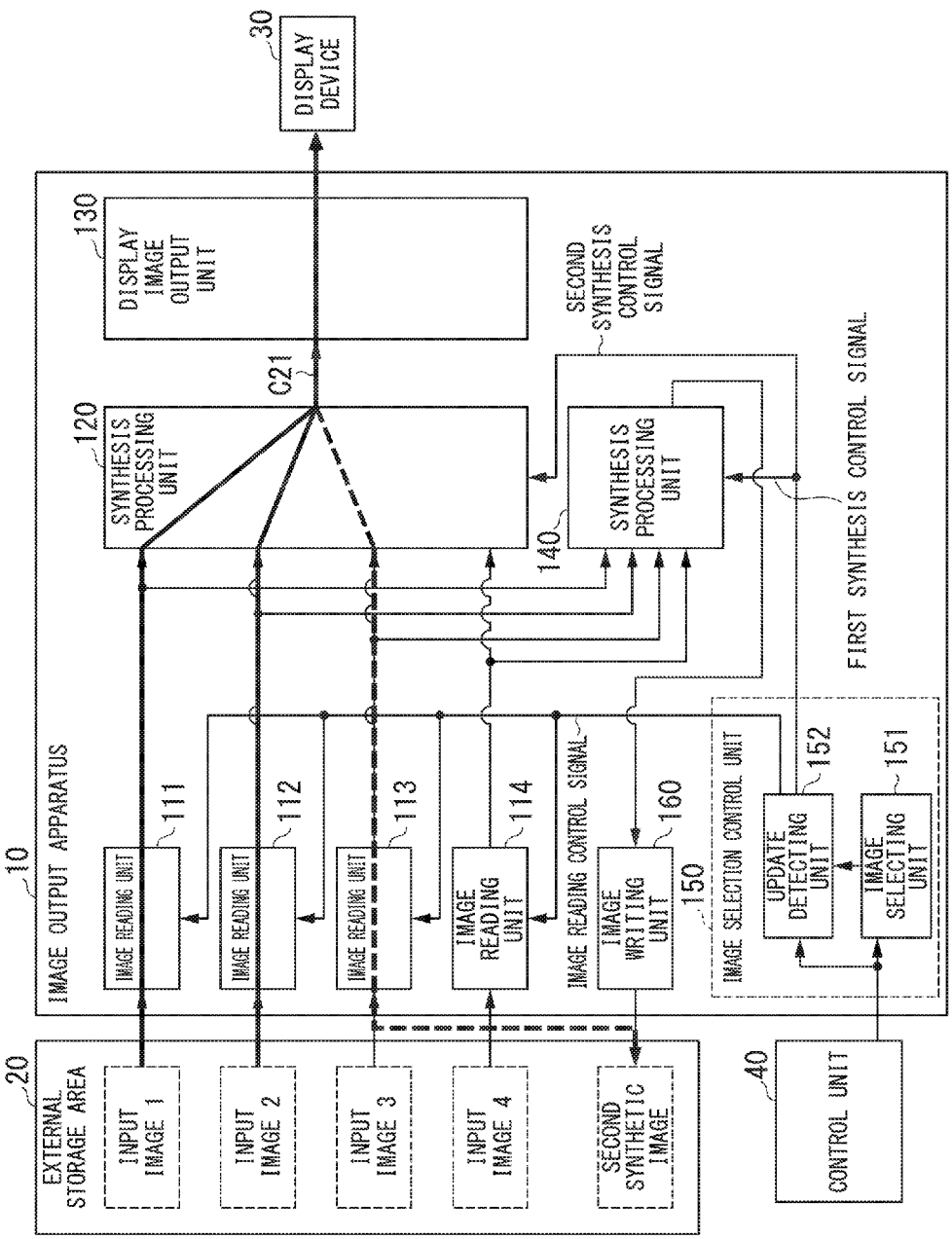
FIG. 4 is a diagram schematically showing a second exemplary operation of generating a synthetic image when an input image having a low update frequency is not updated in the image output apparatus, according to the present embodiment.

Each operation in the image output apparatus 10 according to the first embodiment of the present invention will be described. FIG. 3 is a diagram schematically showing a first exemplary operation of generating a synthetic image on which a plurality of input images are superimposed in the image output apparatus 10 of the present embodiment. FIG. 4 is a diagram schematically showing a second exemplary operation of generating a synthetic image when an input image having a low update frequency is not updated in the image output apparatus 10 of the present embodiment.

The following description will proceed under the assumption that information representing the state shown in FIG. 2 is set as the input image information set to the image output apparatus 10 through the control unit 40. More specifically, the image selection information for selecting the input image 1 to the input image 4 as input images that are to be subjected to the synthesis process is set. The update frequency information representing that the input image 1 and the input image 2 are input images having the high update frequency, and the input image 3 and the input image 4 are input images having the low update frequency is assumed to be set.

<First Operation>

The first operation is an operation in which the image output apparatus 10 outputs image data of a display image of a first frame to be displayed on the display device 30. In the first operation, the synthesis processing unit 120 generates the first synthetic image including all input images to be displayed on the display device 30, and outputs the first synthetic image to the display image output unit 130. Further, in the first operation, the synthesis processing unit 140 generates the second synthetic image including input images having the low update frequency, and outputs the second synthetic image to the image writing unit 160. In FIG. 3, image data paths in the first operation are indicated on the block diagram of the image output apparatus 10 shown in FIG. 1.

In the first operation, first, the image selecting unit 151 of the image selection control unit 150 selects the input image 1 to the input image 4 stored in the external storage area 20 as input images used for generation of the first synthetic image based on the image selection information set by the control unit 40. Then, the image selecting unit 151 outputs the first image selection information representing the selected input images to the update detecting unit 152. Then, the update detecting unit 152 of the image selection control unit 150 outputs the image reading control signals for giving an instruction to read image data of the input image 1 to the input image 4 used for generation of the first synthetic image from the external storage area 20 to the image reading units 111 to 114 based on the first image selection information input from the image selecting unit 151. Further, the update detecting unit 152 outputs the first synthesis control signal for generating the first synthetic image by performing the synthesis process on the image data of the input image 1 to the input image 4 read by the image reading units 111 to 114 to the synthesis processing unit 120.

Through the first operation, the image data of the input image 1 to the input image 4 read from the external storage area 20 through the image reading units 111 to 114 is input to the synthesis processing unit 120 through an image data path of a path C11 shown in FIG. 3. Then, the synthesis processing unit 120 generates the first synthetic image by performing the synthesis process on the input image data of the input image 1 to the input image 4, and outputs image data of the generated first synthetic image to the display image output unit 130. Then, the display image output unit 130 outputs image data of a display image obtained by converting a format of the input image data of the first synthetic image to the display device 30. As a result, the image according to the first synthetic image generated using the input image 1 to the input image 4 is displayed on the display device 30.

Further, in the first operation, the image selecting unit 151 outputs the second image selection information representing that the input image 3 and the input image 4 having the low update frequency among the input images included in the first synthetic image are selected as input images used for generation of the second synthetic image based on the update frequency information set by the control unit 40 to the update detecting unit 152. Then, the update detecting unit 152 outputs the second synthesis control signal for generating the second synthetic image by performing the synthesis process on image data of the input image 3 and the input image 4 used for generation of the second synthetic image based on the second image selection information input from the image selecting unit 151 to the synthesis processing unit 140.

As a result, the synthesis processing unit 140 generates the second synthetic image by performing the synthesis process on the image data of the input image 3 and the input image 4 input through an image data path of a path C12 shown in FIG. 3, and outputs the generated image data of the second synthetic image to the image writing unit 160. Then, the image writing unit 160 writes the input image data of the second synthetic image in the external storage area 20 through the DMA transfer. As a result, the image data of the second synthetic image generated by performing the synthesis process on the input image 3 and the input image 4 having the low update frequency is stored in the external storage area 20.

As described above, in the first operation, the image data of the display image according to the first synthetic image including all the input images to be displayed on the display device 30 is output to the display device 30, and the image data of the second synthetic image including only the input images having the low update frequency is written in the external storage area 20.

Thereafter, the update detecting unit 152 detects whether or not the input images included in the second synthetic image have been updated based on the image update information input from the control unit 40. Then, when the update detecting unit 152 detects that none of the input images included in the second synthetic image has been updated, the image output apparatus 10 performs a second operation which will be described below.

<Second Operation>

The second operation is an operation in which the image output apparatus 10 outputs image data of a display image of a next frame (including a subsequent frame) to be displayed on the display device 30 using the second synthetic image generated in the first operation. In the second operation, the synthesis processing unit 120 generates the third synthetic image that is identical to the first synthetic image using all the input images having the high update frequency to be displayed on the display device 30 and the second synthetic image including all the input images having the low update frequency, and outputs the third synthetic image to the display image output unit 130. In FIG. 4, image data paths in the second operation are indicated on the block diagram of the image output apparatus 10 shown in FIG. 1.

In the second operation, first, the image selecting unit 151 of the image selection control unit 150 selects the input image 1 and the input image 2 having the high update frequency stored in the external storage area 20 and the second synthetic image stored in the external storage area 20 as input images used for generation of the third synthetic image based on the image selection information set by the control unit 40. Thus, the second synthetic image is an input image selected instead of the input image 3 and the input image 4 having the low update frequency. Then, the image selecting unit 151 outputs the first image selection information representing the selected input image to the update detecting unit 152. Then, the update detecting unit 152 outputs the image reading control signals for giving an instruction to read the image data of the input image 1 used for generation of the third synthetic image, the input image 2, and the second synthetic image from the external storage area 20 based on the first image selection information input from the image selecting unit 151 to the image reading unit 111 to the image reading unit 113. Further, the update detecting unit 152 outputs the first synthesis control signal for generating the third synthetic image by performing the synthesis process on the image data of the input image 1, the input image 2, and the second synthetic image read by the image reading unit 111 to the image reading unit 113 to the synthesis processing unit 120.

Through this operation, the image data of the input image 1, the input image 2, and the second synthetic image read from the external storage area 20 through the image reading unit 111 to the image reading unit 113 is input to the synthesis processing unit 120 through an image data path of a path C21 shown in FIG. 4. Then, the synthesis processing unit 120 generates the third synthetic image by performing the synthesis process on the input image data of the input image 1, the input image 2, and the second synthetic image, and outputs image data of the generated third synthetic image to the display image output unit 130. Then, the display image output unit 130 outputs image data of a display image obtained by converting a format of the input image data of the third synthetic image to the display device 30. As a result, an image according to the third synthetic image generated using the input image 1, the input image 2, and the second synthetic image is displayed on the display device 30. Here, the image displayed on the display device 30 is the same image as the image displayed on the display device 30 in the first operation as described above.

As described above, in the second operation, the third synthetic image that is identical to the first synthetic image including all the input images to be displayed on the display device 30 is generated using the input image 1 and the input image 2 having the high update frequency and the second synthetic image, and the image data of the display image according to the generated third synthetic image is output to the display device 30. As a result, in the second operation, the input images that are smaller in number than the input images read from the external storage area 20 in the first operation are read, and the third synthetic image that is identical to the first synthetic image generated in the first operation is generated.

When it is detected that any one of the input images included in the second synthetic image has been updated as a result of detecting whether or not the input image included in the second synthetic image has been updated based on the image update information input from the control unit 40 through the update detecting unit 152, the image output apparatus 10 performs the first operation. As a result, the synthesis processing unit 140 generates a new second synthetic image in which any one of the input images included in the second synthetic image has been updated. Then, the new second synthetic image is transferred through the image writing unit 160 in the DMA transfer manner, and the image data of the second synthetic image stored in the external storage area 20 is updated to the image data of the new second synthetic image.

Thereafter, when it is detected that none of the input images included in the second synthetic image has been updated as a result of detecting whether or not the input image included in the second synthetic image has been updated based on the image update information input from the control unit 40 through the update detecting unit 152, the image output apparatus 10 performs the second operation. As a result, the image according to the third synthetic image generated using the second synthetic image stored in the external storage area 20 is displayed on the display device 30.

As described above, in the image output apparatus 10, when none of the input images included in the second synthetic image has been updated, the second operation of generating the third synthetic image using the second synthetic image is performed, and thus the data amount of the DMA transfer performed by the image reading unit 110 in the second operation can be reduced to be smaller than the data amount in the first operation, and the power consumption of the image output apparatus 10 can be reduced.

In the second operation, the image reading unit 114, the synthesis processing unit 140, and the image writing unit 160 do not operate as shown in FIG. 4. Thus, in the second operation, it is possible to stop a clock signal or the like from being supplied to a component that is not being operated. As a result, it is possible to further reduce the power consumption when the second operation is performed in the image output apparatus 10.

In the above description, when the new second synthetic image is generated in the first operation, the image data of the second synthetic image stored in the external storage area 20 is updated to the image data of the new second synthetic image. In other words, the example in which the image data of the new second synthetic image is overwritten on the image data of the second synthetic image has been described. However, instead of overwriting the image data of the new second synthetic image on the image data of the second synthetic image, image data of a plurality of second synthetic images may be stored in the external storage area 20, and the second synthetic image used to generate the third synthetic image may be switched in the second operation.

Through the above configuration, it is possible to easily implement, for example, a function of displaying a character image indicating a remaining level of a battery provided in the imaging apparatus included in the input image 4 shown in FIG. 2 in a blinking manner. As this function is implemented, the data amount of the DMA transfer performed by the image reading unit 110 in the second operation in this function can be reduced to be smaller than the data amount in the first operation, and thus the power consumption of the image output apparatus 10 can be reduced. More specifically, in the first operation, the image data of both second synthetic images including a second synthetic image in a state in which a character image is lit up and a second synthetic image in a state in which a character image is turned off is stored in the external storage area 20. Then, in the second operation, the second synthetic images are switched at a blinking period of the character image, and thus the function of displaying the character image in the blinking manner can be easily implemented. In this case, information representing that any one of the input images included in the second synthetic image is periodically switched is set to the image selection control unit 150 according to a setting of the input image information (the image selection information, the update frequency information, and the image update information) or any other information set by the control unit 40.

Figure 5A:
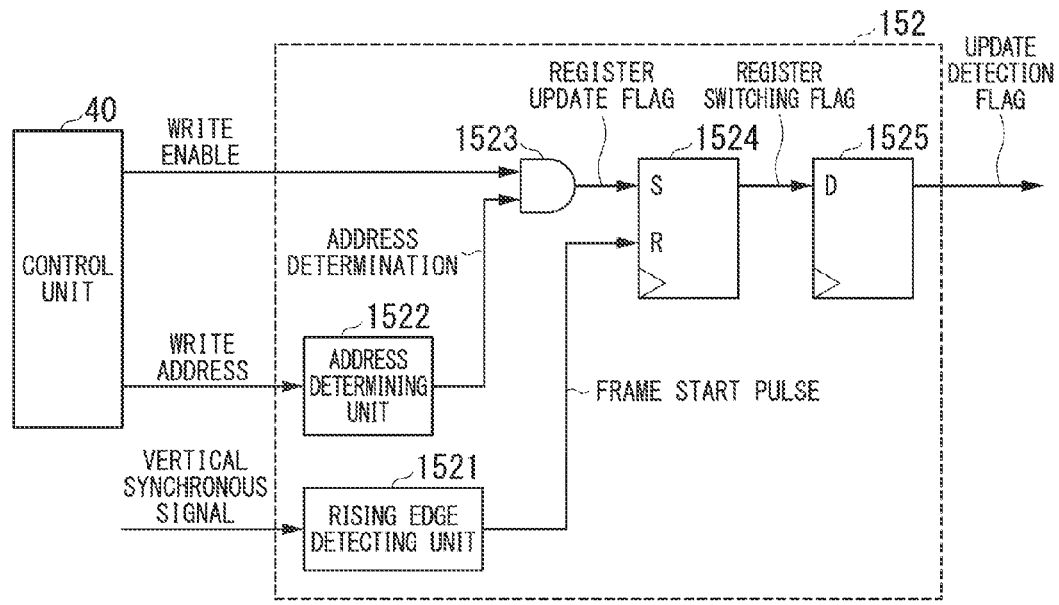
FIG. 5A is a diagram for showing a schematic configuration of an update detecting unit of the image output apparatus according to the present embodiment.
Figure 5B:
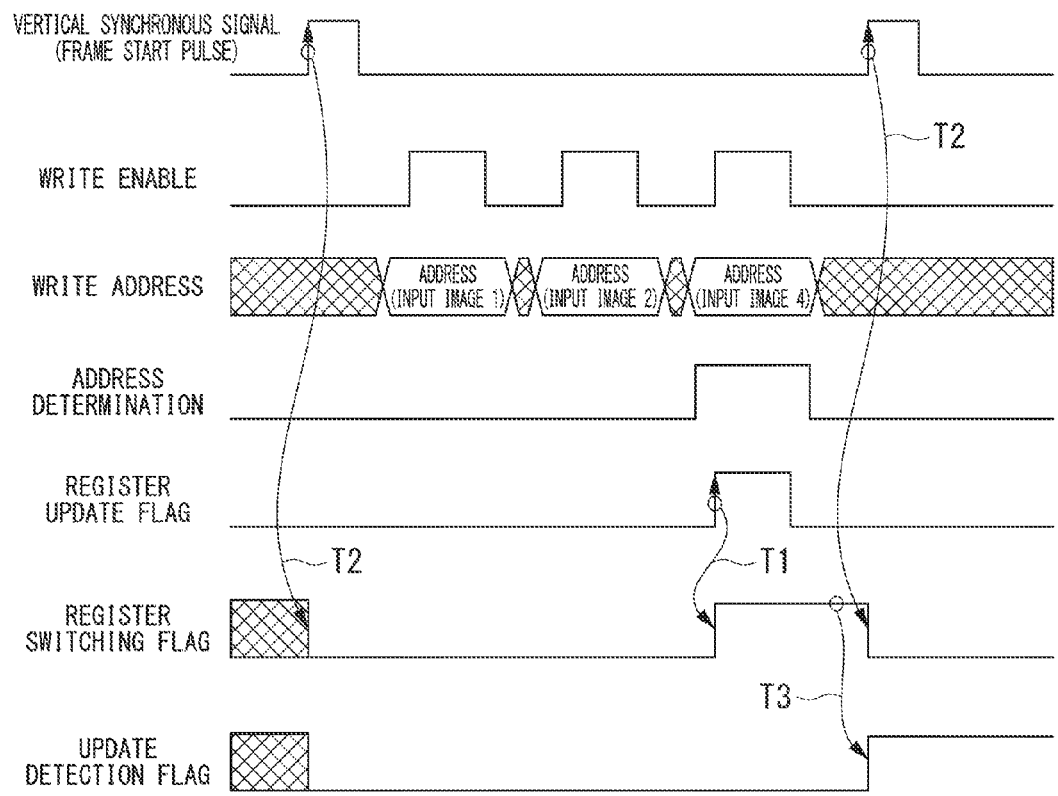
FIG. 5B is a diagram for showing an operation of the update detecting unit of the image output apparatus according to the present embodiment.
Figure 6:
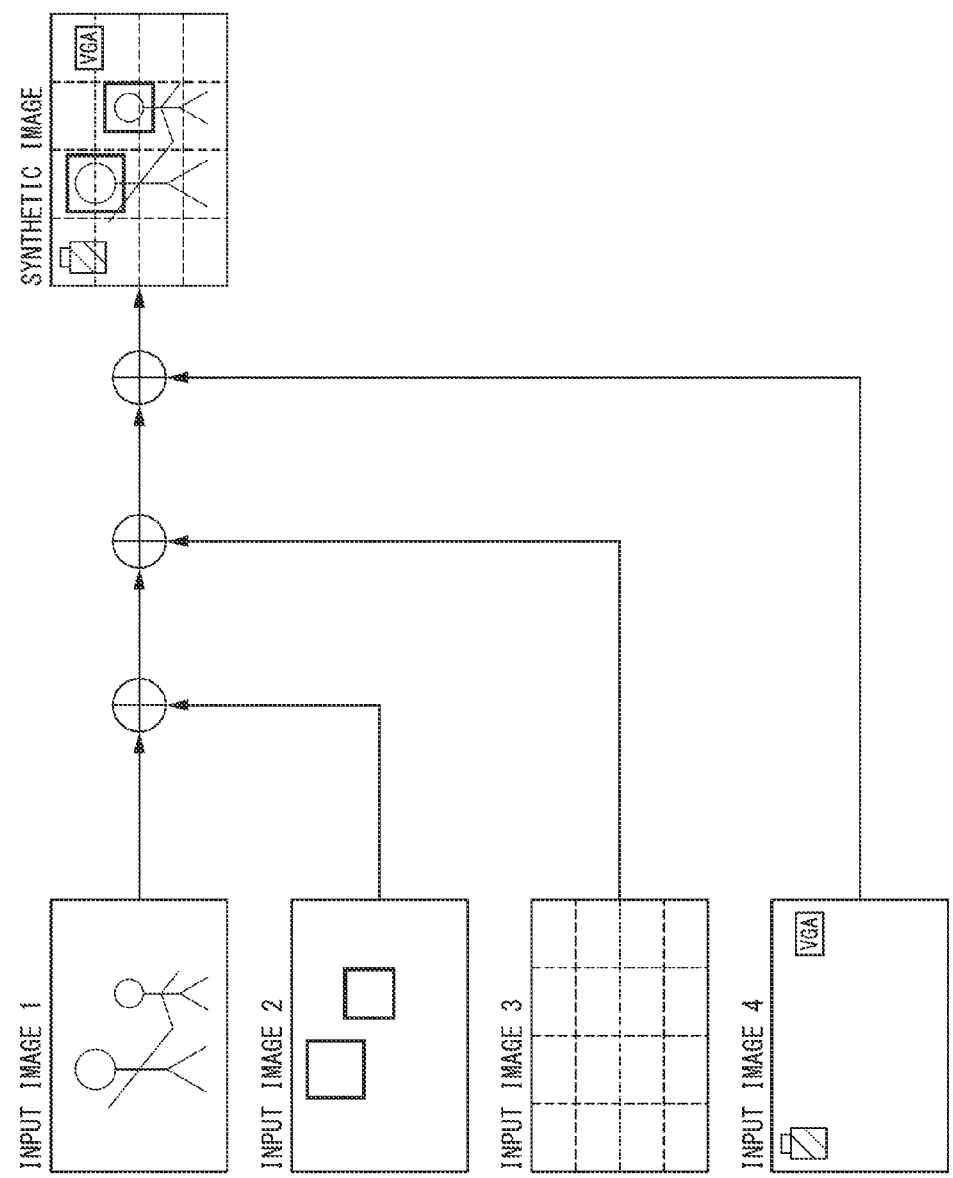
FIG. 6 is a schematic diagram showing an example of generating a synthetic image on which a plurality of input images is superimposed.

Next, an exemplary configuration and operation of detecting whether or not the input image included in the second synthetic image has been updated through the update detecting unit 152 will be described. FIGS. 5A and 5B are diagrams for showing a schematic configuration and operation of the update detecting unit 152 provided in the image output apparatus 10 of the present embodiment. FIG. 5A shows an exemplary configuration of the update detecting unit 152, and FIG. 5B shows an exemplary operation timing of the update detecting unit 152.

The update detecting unit 152 shown in FIG. 5A includes a rising edge detecting unit 1521, an address determining unit 1522, an AND circuit 1523, an RS type flip flop (FF) 1524, and a D type FF 1525. FIG. 5A shows the control unit 40 that inputs the image update information to the update detecting unit 152 together. The update detecting unit 152 shown in FIG. 5A is configured to detect whether or not an input image is updated during each period of the frame rate at which the display device 30 displays an image of each frame.

As described above, the control unit 40 outputs each signal when access to the external storage area 20 or a component associated with an update of an input image is performed even to the update detecting unit 152 as the image update information. The update detecting unit 152 having the configuration shown in FIG. 5A receives a write enable signal output when data is written in each component controlled by the control unit 40 and an address designating an area in which data is written as the image update information. The update detecting unit 152 detects whether or not the input image included in the second synthetic image has been updated based on the input image update information.

The rising edge detecting unit 1521 detects a rising edge of a vertical synchronous signal VD input to the display device 30, and outputs a frame start pulse indicating a timing at which the display device 30 starts to display an image.

The address determining unit 1522 determines whether or not a write address input from the control unit 40 is an address corresponding to the input images included in the second synthetic image, and outputs an address determination signal representing a determination result to the AND circuit 1523.

The AND circuit 1523 outputs a register update flag based on the write enable signal input from the control unit 40 and the address determination signal input from the address determining unit 1522.

Through the configuration including the address determining unit 1522 and the AND circuit 1523, the update detecting unit 152 generates the register update flag representing a result of detecting whether or not a process of writing to a certain register such as an address of an input image included in the second synthetic image from the control unit 40 has been performed within a period of one vertical synchronous signal VD.

The RS type flip flop (FF) 1524 outputs a register switching flag representing whether or not switching of the input image included in the second synthetic image has been performed. When the register update flag input to a set terminal S represents that the process of writing to the certain register has been performed, the RS type FF 1524 sets the register switching flag to a state representing that the switching of the input image included in the second synthetic image has been performed. Further, when the frame start pulse input to a reset terminal R represents a timing at which the display device 30 starts to display an image, the RS type FF 1524 clears the register switching flag to be set to a state in which the switching of the input image included in the second synthetic image has not been performed. As a result, the RS type FF 1524 represents whether or not the input image has been switched, that is, the input images included in the second synthetic image have been changed at the period of the vertical synchronous signal VD input to the display device 30 using the register switching flag.

The D type FF 1525 outputs an update detection flag recording (holding) the state of the register switching flag at a timing before the register switching flag is cleared. The update detection flag output by the D type FF 1525 is a flag representing whether or not the input image included in the second synthetic image has been updated, that is, a result of detecting whether or not the input image included in the second synthetic image has been updated.

An operation of each component of the update detecting unit 152 will be described in detail with reference to an exemplary operation timing of the update detecting unit 152 shown in FIG. 5B. A timing shown in FIG. 5B represents an exemplary operation of the update detecting unit 152 when the input image 4 having the low update frequency has been updated.

The rising edge detecting unit 1521 detects the rising edge of the vertical synchronous signal VD input to the display device 30, and outputs the frame start pulse having the "High" level as shown in FIG. 5B.

When the write address input from the control unit 40 is an address corresponding to an input image included in the second synthetic image, the address determining unit 1522 outputs the address determination signal of the "High" level to the AND circuit 1523. FIG. 5B shows an example in which the address determining unit 1522 determines that the write address of the input image 3 has been input from the control unit 40 and outputs the address determination signal of the "High" level.

When the write enable signal input from the control unit 40 has the "High" level representing data writing, and the address determination signal input from the address determining unit 1522 has the "High" level representing that an address corresponds to an input image included in the second synthetic image, the AND circuit 1523 outputs the register update flag of the "High" level as shown in FIG. 5B.

When the register update flag input to the set terminal S has the "High" level representing that the address corresponds to the input image included in the second synthetic image, the RS type FF 1524 sets the register switching flag to the "High" level in which the switching of the input image included in the second synthetic image has been performed (see a timing T1 in FIG. 5B).

Further, when the frame start pulse input to the reset terminal R has the "High" level as the rising edge of the vertical synchronous signal VD representing a timing at which the display device 30 starts to display an image is detected, the RS type FF 1524 clears the register switching flag to have the "Low" level representing that the switching of the input image included in the second synthetic image has not been performed (see a timing T2 in FIG. 5B).

The D type FF 1525 latches the state of the register switching flag (see a timing T3 in FIG. 5B) at a timing before the register switching flag is cleared, and outputs the update detection flag of the latched state. In the example shown in FIG. 5B, the "High" level of the register switching flag is latched, and the update detection flag of the "High" level is output.

Through this configuration and operation, the update detecting unit 152 detects whether or not the input image included in the second synthetic image has been updated during each period of the frame rate of the display device 30. In the exemplary configuration and operation of the update detecting unit 152 shown in FIGS. 5A and 5B, when the update detection flag has the "High" level, it represents the state in which it is detected that any one of the input images included in the second synthetic image has been updated, and when the update detection flag has the "Low" level, it represents that it is detected that none of the input images included in the second synthetic image has been updated.

Then, the update detecting unit 152 outputs the image reading control signal, the first synthesis control signal, and the second synthesis control signal to the image reading units 110, the synthesis processing unit 120, and the synthesis processing unit 140, respectively, based on the state of the update detection flag.

As the method of detecting whether or not the input image included in the second synthetic image has been updated through the update detecting unit 152, various implementation methods are considered in addition to the method shown in the configuration and operation of the update detecting unit 152 shown in FIGS. 5A and 5B. Thus, in the present embodiment, the method of detecting whether or not the input image included in the second synthetic image has been updated is not limited at all.

As described above, according to the embodiment for carrying out the present invention, the image output apparatus includes a first synthesis processing unit (the synthesis processing unit 120 in the embodiment) that generates the first synthetic image by the synthesis process of causing a plurality of input images stored in the external storage area to be superimposed and a second synthesis processing unit (the synthesis processing unit 140 in the embodiment) that selects only the input images having the low update frequency among a plurality of input images included in the first synthetic image and generates the second synthetic image by performing the synthesis process on the selected images. Further, in the embodiment for carrying out the present invention, the second synthesis processing unit causes the generated second synthetic image to be stored (written) in the external storage area. In other words, in the embodiment for carrying out the present invention, instead of storing the synthetic image (corresponding to the first synthetic image in the embodiment) generated by performing the synthesis process on all the input images to be displayed on the display device, that is, the image data of the display image to be displayed on the display device in the external storage area as in the image output apparatus of the related art, the second synthetic image generated by selecting only the input images having the low update frequency and performing the synthesis process on the selected input images is stored in the external storage area. Further, in the embodiment for carrying out the present invention, when none of the input images included in the second synthetic image has been updated, the second synthetic image stored in the external storage area is read instead of reading a plurality of input images having a low update frequency stored in the external storage area, and the first synthesis processing unit generates the first synthetic image by performing the synthesis process on the input image having the high update frequency and the second synthetic image instead of the input image having the low update frequency. In other words, in the embodiment for carrying out the present invention, the input image having the low update frequency used for generation of the first synthetic image is switched to the second synthetic image.

As a result, in the embodiment for carrying out the present invention, the data amount when the image output apparatus reads a plurality of input images having a low update frequency can be reduced to the data amount when one input image (the second synthetic image) is read. Thus, in the embodiment for carrying out the present invention, the power consumption when the image output apparatus reads image data of a plurality of input images having a low update frequency can be reduced to the power consumption when one input image (the second synthetic image) is read. In other words, in the embodiment for carrying out the present invention, it is possible to reduce the power consumption of the image output apparatus when the image output apparatus performs the synthesis process on a plurality of input images having a low update frequency.

Further, in the embodiment for carrying out the present invention, the second synthetic image is generated by performing the synthesis process on only the input images having the low update frequency and written in the external storage area, but the input images having the high update frequency are subjected to the synthesis process through the first synthesis processing unit, similarly to the image output apparatus of the related art. In other words, in the embodiment for carrying out the present invention, the second synthetic image is used instead of the input images having the low update frequency, but the input images having the high update frequency are subjected to the synthesis process using the normally updated input images (the input images updated in units of frames). Further, in the embodiment for carrying out the present invention, when any one of the input images included in the second synthetic image has been updated, a new second synthetic image is generated.

In other words, in the embodiment for carrying out the present invention, instead of generating a synthetic image again by performing the synthesis process on all input images when any one of all input images to be displayed on the display device is updated as in the image output apparatus of the related art, the first synthetic image is generated by performing the synthesis process on all images only when any one of the input images having the low update frequency included in the second synthetic image has been updated.

In the embodiment for carrying out the present invention, the power consumption can be reduced by an amount by which the second synthetic image is used instead of the input images having the low update frequency without impairing the function of causing the images having the high update frequency to be superimposed in the image output apparatus. As a result, in the embodiment for carrying out the present invention, in the imaging apparatus including the image output apparatus, even when an image having a high update frequency updated in units of frames such as a live view image is synthesized with an image having a low update frequency such as an OSD image, and a synthetic image is displayed on the display device, the power consumption of the imaging apparatus can be reduced without lowering the frame rate at which the live view image is displayed.

Further, in the embodiment for carrying out the present invention, an existing compression/decompression technique can be applied to the second synthetic image generated by the second synthesis processing unit. As a result, in the embodiment for carrying out the present invention, it is possible to further reduce the data amount when the second synthetic image is transferred to (read from or written in) the external storage area, and it is possible to further reduce the power consumption related to the transfer of the second synthetic image in the image output apparatus.

Further, in the embodiment for carrying out the present invention, in the second operation of generating the first synthetic image using the input image having the high update frequency and the second synthetic image, the clock signal is stopped from being supplied to a component (the image reading unit 114, the synthesis processing unit 140, and the image writing unit 160 in the second operation shown in FIG. 4 in the embodiment) that is not being operated, and thus it is possible to further reduce the power consumption when the image output apparatus performs the second operation.

Further, the present embodiment has been described in connection with the configuration in which the image output apparatus 10 includes the 4 image reading units 111 to 114, and performs the synthesis process on the 4 input images. However, the number of input images that are subjected to the synthesis process performed by the image output apparatus 10 is not limited to the embodiment for carrying out the present invention, and more input images can be subjected to the synthesis process. In this case, the number of the image reading units 110 provided in the image output apparatus increases according to the number of input images that are subjected to the synthesis process, that is, the image reading units 110 that are equal in number to the input images that are subjected to the synthesis process are provided Here, even when several input images are chronologically read, as long as it is possible to generate the first synthetic image within a period of time (a period of one frame in which an image displayed on the display device 30 is updated) required for display of the display device 30, instead of installing the image reading units 110 that are equal in number to the input images that are subjected to the synthesis process, any one of the image reading units 110 may be configured to chronologically read a plurality of input images.

Further, the present embodiment has been described in connection with the exemplary configuration of the image output apparatus 10 that outputs the image data of the first synthetic image to be displayed on the display device 30, and outputs the image data of the second synthetic image to be stored in the external storage area 20, but the method of using the first synthetic image and the second synthetic image generated by the image output apparatus 10 is not limited to the embodiment for carrying out the present invention. For example, a display image output unit that outputs even the image data of the first synthetic image to be stored in the external storage area 20, reads the image data of the first synthetic image stored in the external storage area 20, converts the read image data into a format in which the display device displays an image, and outputs the resultant image data may be installed separately from the image output apparatus 10, and in this case, the method of the present invention can be similarly applied.

Further, in the image output apparatus of the present invention, when all input images have a low update frequency, similarly to the image output apparatus of the related art, image data of a synthetic image generated by performing the synthesis process on all input images to be displayed on the display device may be stored in the external storage area, that is, the first synthetic image in the embodiment may be stored in the external storage area 20. In this case, the image selection control unit 150 may control the synthesis processing unit 140 such that the second synthetic image identical to the first synthetic image generated by the synthesis processing unit 120 is generated.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image output apparatus, comprising:
a first synthesis processor configured to read a plurality of designated input images from an external storage area storing the plurality of input images, generate a first synthetic image for display through a synthesis process of causing one of the plurality of read input images to be superimposed on any other one of the plurality of read input images, and output the first synthetic image;
a second synthesis processor configured to generate a second synthetic image for synthesis through a synthesis process of causing the plurality of designated input images to be superimposed on any other one of the plurality of input images included in the first synthetic image and cause the second synthetic image to be stored in the external storage area; and
an image selection controller configured to instruct the second synthesis processor to generate the second synthetic image including the plurality of input images selected based on input image information that is input, select whether or not the second synthetic image is used as one of the input images used to generate the first synthetic image based on the input image information, and instruct the first synthesis processor to generate the first synthetic image including the plurality of selected input images,
wherein the image selection controller includes an image selector configured to select the plurality of input images to be included in the first synthetic image based on information of the plurality of input images used for generation of the first synthetic image, the information being included in the input image information, and select the input image having a low update frequency satisfying a predetermined condition among the plurality of input images to be included in the first synthetic image based on information of an update frequency corresponding to each of the input images, the information being included in the input image information, and
wherein an instruction to generate the second synthetic image by performing the synthesis process on the plurality of input images having the low update frequency selected by the image selector is sent.

2. The image output apparatus according to claim 1,
wherein the image selection controller comprises an update detector configured to detect an update of any one of the plurality of input images having the low update frequency included in the second synthetic image based on image update information used to detect whether or not each of the input images has been updated, the image update information being included in the input image information,
wherein when the update detector detects that none of the input images included in the second synthetic image has been updated, an instruction to generate the first synthetic image by performing the synthesis process on the plurality of input images having the high update frequency read from the external storage area using the second synthetic image as one of the input images is sent by the image selection controller, but an instruction to generate the second synthetic image is not sent by the image selection controller, and
wherein when the update detector detects that any one of the input images included in the second synthetic image has been updated, an instruction to generate the first synthetic image by performing the synthesis process on the plurality of input images having the high update frequency read from the external storage area and the plurality of input images having the low update frequency is sent by the image selection controller, and an instruction to generate the second synthetic image by performing the synthesis process on the plurality of input images having the low update frequency is sent by the image selection controller.

3. The image output apparatus according to claim 1,
wherein the first synthesis processor includes an image reader configured to read the plurality of input images which are designated by the image selection controller from the external storage area, the second synthesis processor generates the second synthetic image by performing the synthesis process on the plurality of input images which are designated by the image selection controller among the plurality of input images read by the image reader, and
wherein the second synthesis processor includes an image writer configured to store the generated second synthetic image in the external storage area.

4. The image output apparatus according to claim 3, wherein when the first synthesis processor generates the first synthetic image using the second synthetic image as one of the plurality of input images, the image reader reads the second synthetic image as one of the plurality of input images from the external storage area.

5. The image output apparatus according to claim 3,
wherein the first synthesis processor comprises a plurality of image readers corresponding to the input images read from the external storage area, and
wherein the second synthesis processor generates the second synthetic image by performing the synthesis process on the plurality of input images which are designated by the image selection controller among the input images read from the plurality of image readers.

6. The image output apparatus according to claim 1,
wherein the second synthesis processor generates transparency information of the second synthetic image based on the transparency information of each of the plurality of input images included in the second synthetic image, and causes the generated transparency information and the generated second synthetic image to be stored in the external storage area, and
wherein the first synthesis processor uses the transparency information of each of the plurality of input images included in the first synthetic image for generation of the first synthetic image.

7. The image output apparatus according to claim 1,
wherein the second synthesis processor compresses the generated second synthetic image, and then causes the compressed second synthetic image to be stored in the external storage area, and
wherein the first synthesis processor decompresses the compressed second synthetic image, and then uses the decompressed second synthetic image for generation of the first synthetic image.

8. An image output method, comprising:
a first synthesis processing process of
reading a plurality of designated input images from an external storage area storing the plurality of input images,
generating a first synthetic image for display through a synthesis process of causing one of the plurality of the read input images to be superimposed on any other one of the plurality of read input images, and outputting the first synthetic image;

a second synthesis processing process of
    generating a second synthetic image for synthesis through a synthesis process of causing the plurality of designated input images to be superimposed on any other one of the plurality of input images included in the first synthetic image, and
    causing the second synthetic image to be stored in the external storage area; and
an image selection control process of
    instructing the second synthesis processing process to generate the second synthetic image including the plurality of input images selected based on input image information that is input in the second synthesis processing process, selecting whether or not the second synthetic image is to be used as one of the input images used to generate the first synthetic image based on the input image information, and instructing the first synthesis processing process to generate the first synthetic image including the selected input images in the first synthesis processing process, wherein the image selection control process includes an image selecting process used to select the plurality of input images to be included in the first synthetic image based on information of the plurality of input images used for generation of the first synthetic image, the information being included in the input image information, and select the input image having a low update frequency satisfying a predetermined condition among the plurality of input images to be included in the first synthetic image based on information of an update frequency corresponding to each of the input images, the information being included in the input image information, and wherein an instruction for generating the second synthetic image by performing the synthesis process on the plurality of input images having the low update frequency selected by the image selector is sent.

* * * * *